(12) United States Patent
Lee et al.

(10) Patent No.: US 12,358,568 B2
(45) Date of Patent: Jul. 15, 2025

(54) COUPLING STRUCTURE OF REAR END MODULE AND SIDE MEMBER

(71) Applicants: Hyundai Motor Company, Seoul (KR); Kia Corporation, Seoul (KR)

(72) Inventors: Hae-Hoon Lee, Gyeonggi-do (KR); Tae-Gyu Park, Gyeonggi-do (KR); Young-Rock Kim, Gyeonggi-do (KR); Jung-Ho Lee, Gyeonggi-do (KR); Hee-Suk Chung, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 244 days.

(21) Appl. No.: 17/978,575

(22) Filed: Nov. 1, 2022

(65) Prior Publication Data
US 2023/0278645 A1    Sep. 7, 2023

(30) Foreign Application Priority Data
Mar. 7, 2022    (KR) .................. 10-2022-0028634

(51) Int. Cl.
*B62D 25/08*    (2006.01)
*B62D 27/02*    (2006.01)
*B62D 65/06*    (2006.01)

(52) U.S. Cl.
CPC ............. *B62D 27/02* (2013.01); *B62D 25/08* (2013.01); *B62D 27/026* (2013.01); *B62D 65/06* (2013.01)

(58) Field of Classification Search
CPC ........ B62D 25/04; B62D 25/08; B62D 25/06; B62D 25/02; B62D 27/023; B62D 27/065; B62D 65/06

USPC ................. 296/193.3, 4, 8, 23.01, 3, 29, 30
See application file for complete search history.

(56) References Cited

U.S. PATENT DOCUMENTS

| | | | |
|---|---|---|---|
| 4,887,859 A | 12/1989 | Aper | |
| 4,968,087 A * | 11/1990 | Goria | B62D 65/04 |
| | | | 296/29 |
| 6,505,884 B2 | 1/2003 | Phillips et al. | |
| 11,332,196 B2 | 5/2022 | Kiyoshita et al. | |
| 11,772,707 B2 * | 10/2023 | Tsutsumi | B60Q 1/34 |
| | | | 296/193.08 |
| 11,845,504 B2 | 12/2023 | Xin et al. | |
| 2007/0138837 A1 | 6/2007 | Tomioka | |
| 2011/0156447 A1 | 6/2011 | Matsuoka et al. | |

(Continued)

FOREIGN PATENT DOCUMENTS

| | | | |
|---|---|---|---|
| FR | 2865756 A1 | 8/2005 | |
| KR | 10-2004-0024970 A | 3/2004 | |
| KR | 100551251 B1 * | 2/2006 | |

OTHER PUBLICATIONS

KR100551251 Text (Year: 2006).*

*Primary Examiner* — Dennis H Pedder
(74) *Attorney, Agent, or Firm* — Fox Rothschild LLP

(57) ABSTRACT

Embodiments of the present disclosure relate to a coupling structure of a rear end module and a side member, in which the rear end module is coupled to a roof side member or a middle member located on a side surface of a vehicle body on a rear end of a vehicle.
A coupling structure of a rear end module and a side member according to embodiments of the present disclosure includes side members extending toward the rear of a vehicle from a C-pillar member, and a rear end module formed by injection to have an annular shape and coupled to rear ends of the side members.

14 Claims, 12 Drawing Sheets

(56) References Cited

U.S. PATENT DOCUMENTS

| | | |
|---|---|---|
| 2013/0001986 A1 | 1/2013 | Takenaka |
| 2014/0159428 A1 | 6/2014 | Katou et al. |
| 2020/0086922 A1 | 3/2020 | Yamada et al. |
| 2022/0037997 A1 | 2/2022 | Liang |

* cited by examiner

COUPLING STRUCTURE OF REAR END MODULE AND SIDE MEMBER

CROSS-REFERENCE TO RELATED APPLICATION

This application is based on and claims under 35 U.S.C. § 119(a) priority to Korean Patent Application No. 10-2022-0028634, filed on Mar. 7, 2022, which is incorporated herein by reference in its entirety.

TECHNICAL FIELD

Embodiments of the present disclosure relate to a coupling structure of a rear end module and a side member in which the rear end module is coupled to a roof side member or a middle member located on a side surface of a vehicle body on a rear end of a vehicle.

BACKGROUND

Sport utility vehicle (SUV), recreational vehicle (RV), etc. have a tailgate installed on a rear end of the vehicle, so that the rear end of the vehicle is opened and closed by opening and closing the tailgate.

A portion where a tailgate is fastened, that is, a rear end part is bonded to a rear end of a side member extending to the rear of the vehicle from a C-pillar member 111, for example, a roof side member 112 and a middle member 113. The roof side member 112 and the middle member 113 form a closed cross-sectional structure inside a portion not bonded to the rear end part, but the closed cross-sectional structure is not formed in a portion bonded to the rear end part.

For example, describing the cross-sectional structure of the middle member 113 with reference to FIGS. 2 to 4, each of a cross section of a middle portion of the rear end part and a cross section of a middle portion of the middle member 113 is formed with a space S becoming the closed cross section (see FIGS. 2 and 3). By forming the closed cross-sectional structure by the space S, rigidity is sufficiently exerted.

However, the closed cross-section is lost in a portion where the middle member 113 is bonded to the rear end part (see FIG. 4), and the connectivity between the middle member 113 and the rear end part is weakened, thereby reducing the rigidity of the vehicle body.

This is also applied to a portion where the roof side member 112 is bonded to the rear end part.

The contents described in Description of Related Art are to help the understanding of the background of the present disclosure, and can include what is not previously known to those skilled in the art to which the present disclosure pertains.

SUMMARY

Embodiments of the present disclosure are related to a coupling structure of a rear end module and a side member, which allows the rear end module coupled to a rear end of a vehicle to be formed in an integrated annular structure, and allows a side member disposed on a side surface of the vehicle such as a roof side member or a middle member to be connected to the rear end module while maintaining a closed cross section, thereby improving rigidity.

According to embodiments of the present disclosure, a coupling structure of a rear end module and a side member includes a side member extending toward a rear of a vehicle from a C-pillar member; and a rear end module formed by injection to have an annular shape and coupled to a rear end of the side member.

In some embodiments, the side member is formed with an extension extending from the rear end of the side member in a height direction of the vehicle and connected to a D-pillar.

In some embodiments, a reinforcing member extending from a portion adjacent to the rear end of the side member in a circumferential direction of the rear end module and coupled to the side member and the rear end module is provided on a portion where the side member and the rear end module are coupled.

In some embodiments, the rear end module is injected by an over-mold method to be coupled to the reinforcing member, so that a closed cross section is formed on the rear end module.

In some embodiments, the side member is coupled to the reinforcing member by a fastening bolt or an adhesive.

In some embodiments, the side member and the reinforcing member are overlapped each other, and the fastening bolt penetrates the side member and the reinforcing member in a width direction of the vehicle to fasten the side member and the reinforcing member.

In some embodiments, the side member and the reinforcing member are bonded by the adhesive on a portion spaced apart from the portion fastened by the fastening bolt.

In some embodiments, the reinforcing member is made of a metallic material.

In some embodiments, the rear end module is made of a synthetic resin.

In some embodiments, a fastening bolt fastening the side member and the reinforcing member to the rear end module is fastened to a place where ribs are gathered in the rear end module.

In some embodiments, ribs are radially formed inside the rear end module.

In some embodiments, the side member is a roof side member located on a side surface of a roof of the vehicle to extend from an upper end of the C-pillar member to the rear of the vehicle.

In some embodiments, an extension extending downward from a rear end of the roof side member is formed and is connected to a D-pillar.

In some embodiments, a portion coupled to the roof side member and the rear end module is provided with an upper reinforcing member having a part bonded to the roof side member and the rest coupled to the rear end module.

The side member is a middle member extending from a middle portion of the C-pillar member to the rear of the vehicle.

In some embodiments, an extension each extending in the height direction from a rear end of the middle member is formed and is connected to a D-pillar.

In some embodiments, a middle reinforcing member having a part bonded to the middle member and the rest coupled to the rear end module is provided on portions coupled to the middle member and the rear end module.

According to the coupling structure of the rear end module and the side member according to embodiments of the present disclosure having the above configuration, the rear end module constitutes the over-molding closed cross section with the reinforcing member, and the ribs are radially formed inside the rear end module, thereby improving the rigidity of the cross section.

In addition, as the load path is formed from the roof side member and the middle member to the rear end module, the load acting on the rear portion of the vehicle can be distributed.

In addition, as the connectivity between the roof side member and the middle member increases in the rear end module, the skeletal rigidity can be efficiently reinforced.

DESCRIPTION OF SPECIFIC EMBODIMENTS

Figure 1:
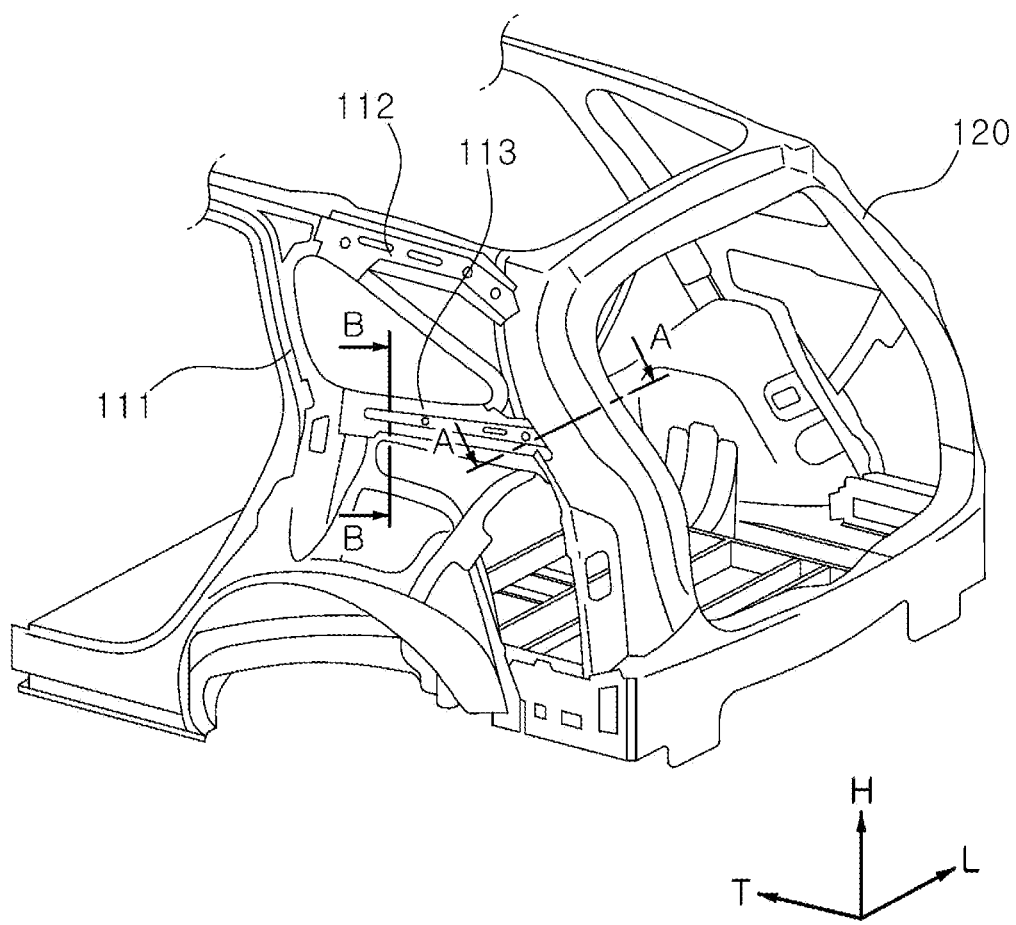
FIG. 1 is a schematic diagram showing a structure of a rear end part of a vehicle according to the related art.
Figure 2:
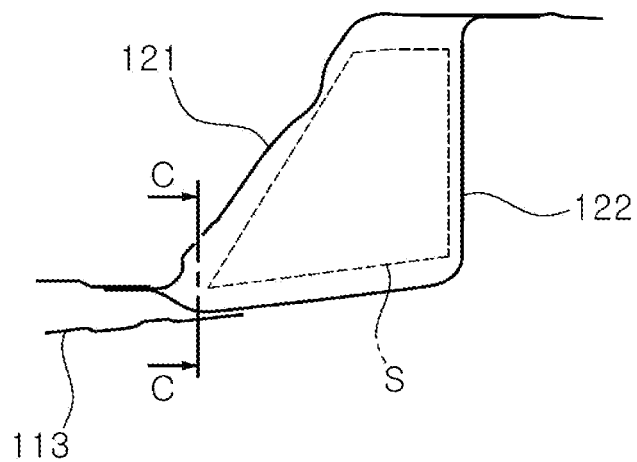
FIG. 2 is a cross-sectional diagram taken along line A-A of FIG. 1.
Figure 3:
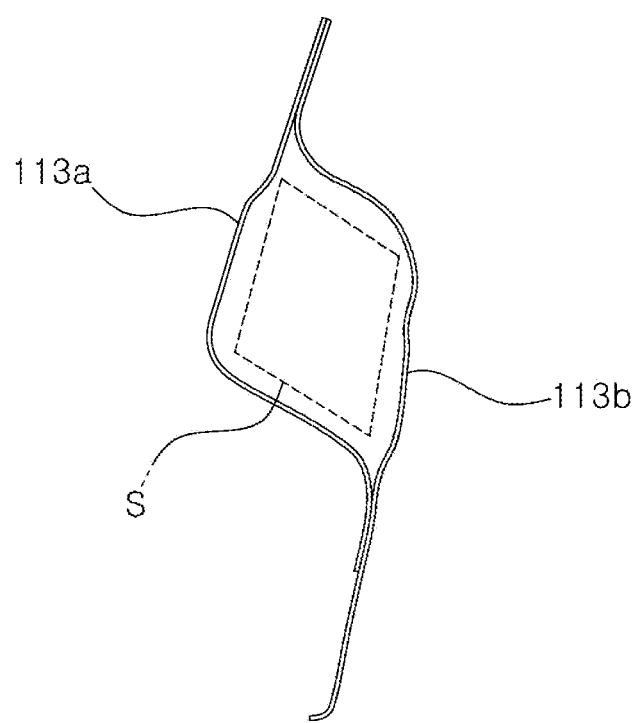
FIG. 3 is a cross-sectional diagram taken along line B-B of FIG. 1.
Figure 4:
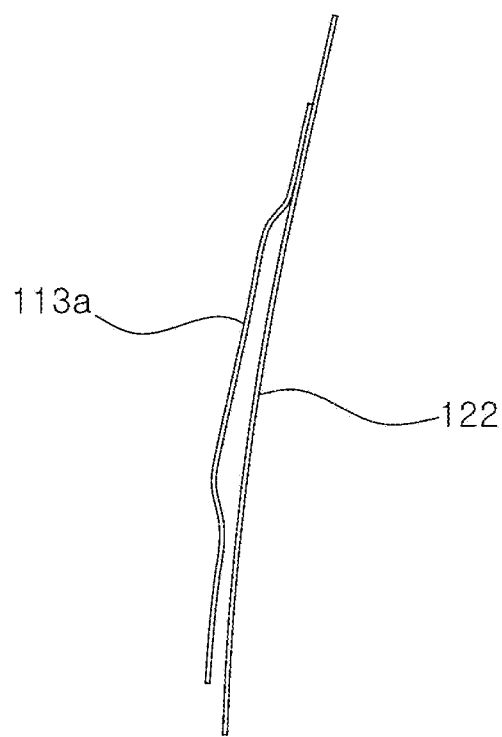
FIG. 4 is a cross-sectional diagram taken along line C-C of FIG. 2.
Figure 5:
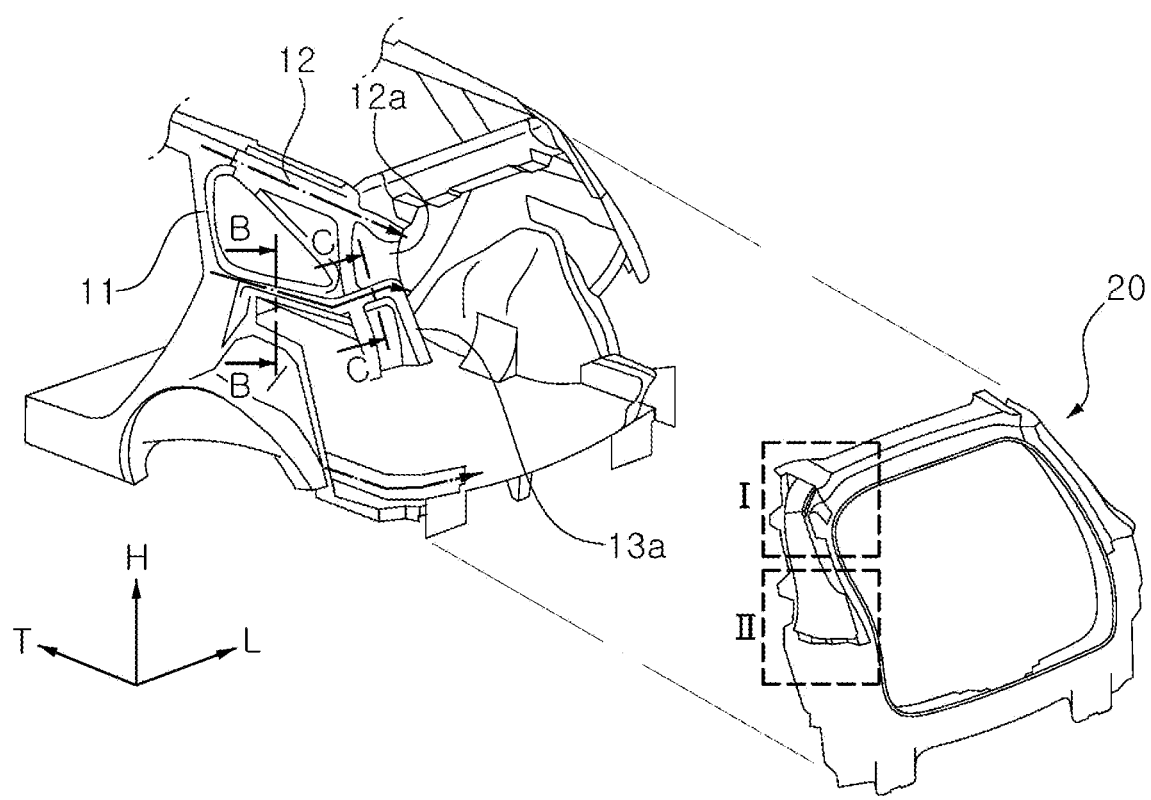
FIG. 5 is an exploded perspective diagram showing a state where a rear end module is coupled to a rear end part according to a coupling structure of the rear end module and a side member according to an embodiment of the present disclosure.
Figure 6:
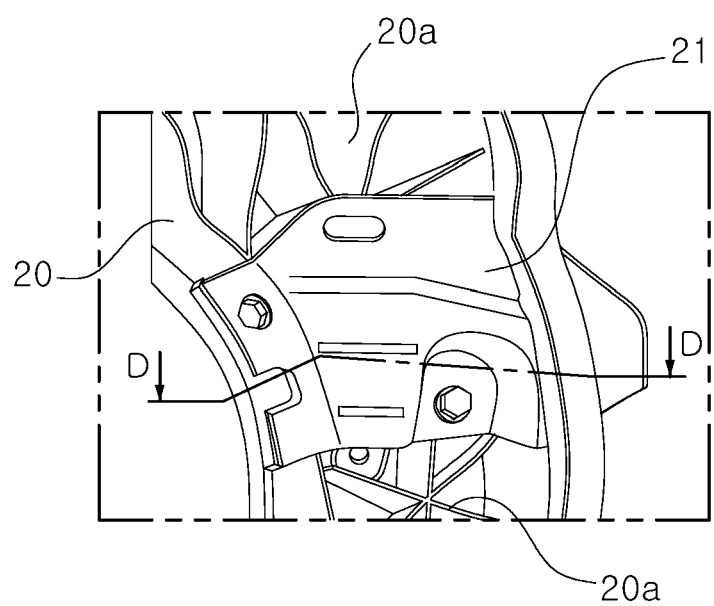
FIG. 6 is a schematic diagram of portion I of FIG. 5 (a state where an upper reinforcing member is fastened to the rear end module).
Figure 7:
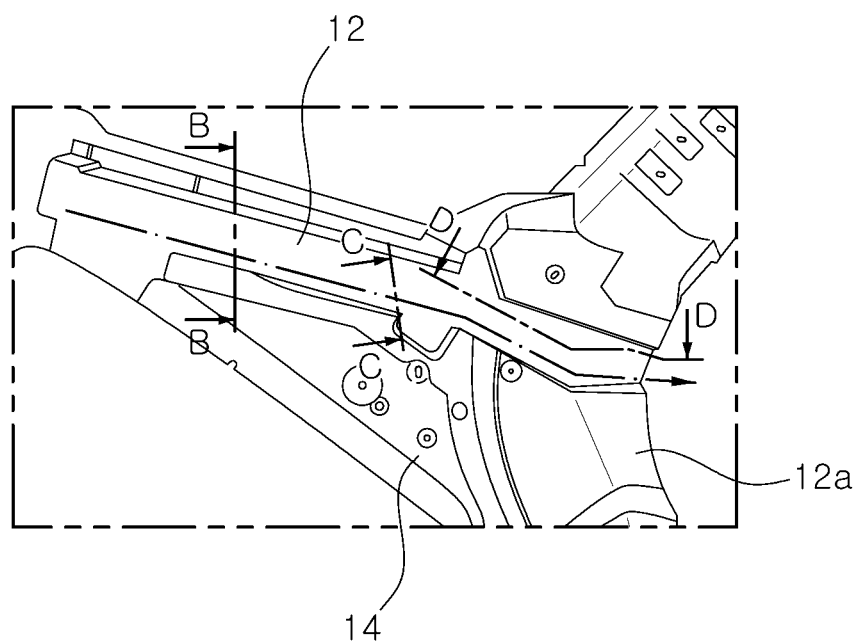
FIG. 7 is a perspective diagram viewed from another direction with respect to portion I of FIG. 5 (a state where the roof side member is coupled to the rear end module).
Figure 8:
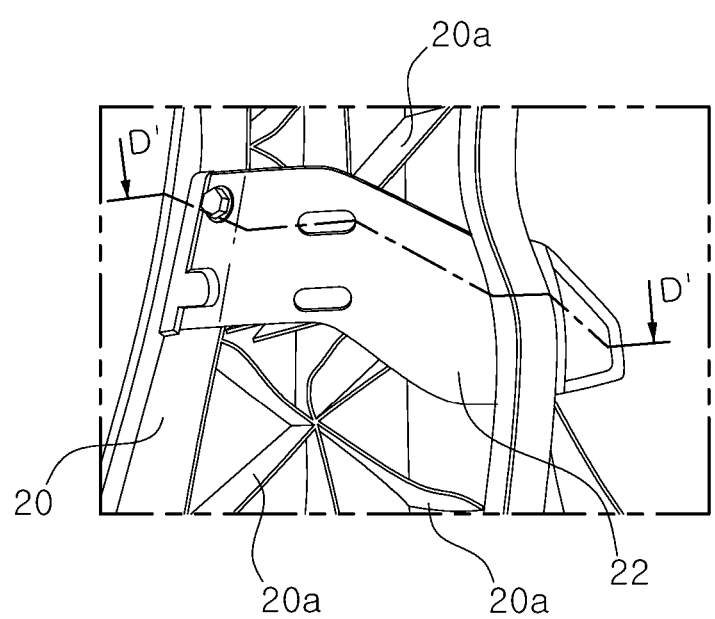
FIG. 8 is a schematic diagram of portion II of FIG. 5 (a state where a middle reinforcing member is fastened to the rear end module).
Figure 9:
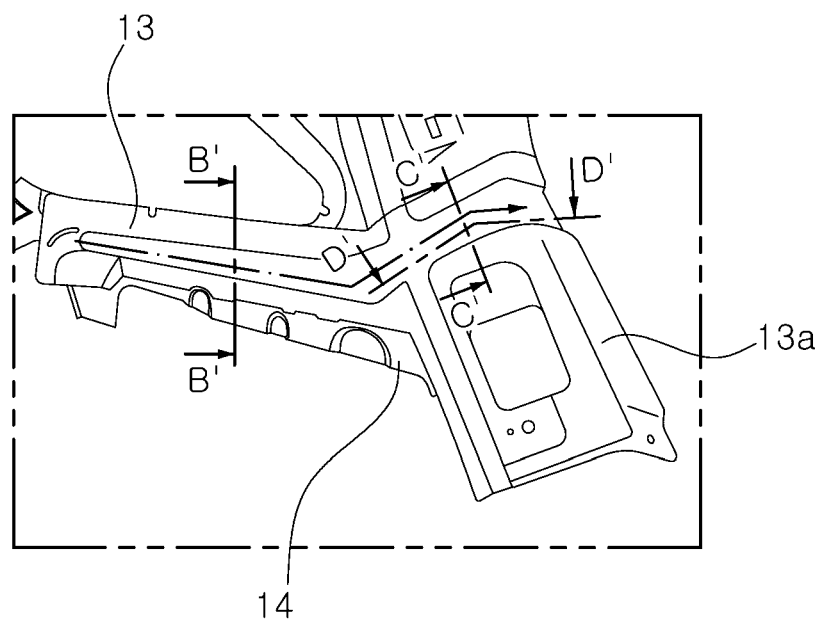
FIG. 9 is a perspective diagram viewed from another direction with respect to portion II of FIG. 5 (a state where a middle member is coupled to the rear end module).

Hereinafter, a coupling structure of a rear end module and a side member according to embodiments of the present disclosure will be described in detail with reference to the accompanying drawings.

A coupling structure of a rear end module and a side member according to embodiments of the present disclosure includes side members 12, 13 extending toward the rear of a vehicle from a C-pillar member 11, and a rear end module 20 formed by injection to have an annular shape and coupled to rear ends of the side members 12, 13.

The side members 12, 13 can be members extending toward the rear of the vehicle from the C-pillar member 11 forming a C-pillar of the vehicle. For example, the side members 12, 13 can be a roof side member 12 extending from an upper end of the C-pillar member 11, and a middle member 13 located under the roof side member 12 and extending from a middle of the C-pillar member 11. The rear end module 20 formed by injection and coupled to the rear ends of the side members 12, 13 is coupled to the rear ends of the side members 12, 13.

First describing the rear end module 20 coupled to the rear ends of the side members 12, 13, the rear end module 20 is integrally formed by injection. The rear end module 20 is formed by injection using a synthetic resin and thus formed integrally. The rear end module 20 has an annular structure along a circumference of the rear end of the vehicle. The rear end module 20 covers the circumference of the rear end of the vehicle, so that when a tailgate is opened, the rear end module 20 becomes an exterior when viewed from the rear of the vehicle.

The rear end module 20 has ribs 20a formed therein. The ribs 20a each are radially formed, thereby increasing the cross-sectional efficiency. A fastening bolt 23 fastening the side members 12, 13 and reinforcing members 21, 22 to the rear end module 20 is fastened to a place where the ribs 20a are gathered in the rear end module 20. Accordingly, the rigidity of the portion where the fastening bolt 23 is fastened can be improved.

When the rear end module 20 is injected, the rear end module 20 is injected to be integrated with the reinforcing member 21, 22 by an over-mold method. By injecting the resin to be the rear end module 20 in a state where the reinforcing members 21, 22 are fixed, the reinforcing members 21, 22 and the rear end module 20 are integrated. As the rear end module 20 is injected by the over-mold method, the rear end module 20 is injected in a state of being coupled to the reinforcing members 21, 22 and is integrated. In addition, the rear end module 20 forms a closed cross section S having a predetermined area on the portions where the reinforcing members 21, 22 are coupled. The closed cross section is connected to the closed cross section S formed by the shapes of the side members 12, 13 to maintain the skeletal cross section for the entire lengths of the side members 12, 13 as much as possible, thereby securing rigidity. According to the related art, as the side members are welded to each other on the portions bonded to the rear end part, the skeletal cross section is lost, but according to embodiments of the present disclosure, the side members 12, 13 maintain the skeletal cross section for the entire length, thereby improving rigidity. In addition, the closed cross section formed by the over-mold method when the rear end module 20 is injected reinforces rigidity together with the ribs 20a radially formed in the rear end module 20.

The side members 12, 13 are coupled to the reinforcing members 21, 22 by the fastening bolts 23 or an adhesive 24.

The side members 12, 13 and the reinforcing members 21, 22 are overlapped each other, and the fastening bolt 23 penetrates the side members 12, 13 and the reinforcing members 21, 22 in a width direction of the vehicle to fasten the side members 12, 13 and the reinforcing members 21, 22. In addition, the side members 12, 13 and the reinforcing members 21, 22 are bonded by the adhesive 24 and coupled to each other on portions spaced apart from the portions fastened by the fastening bolt 23.

Although the rear end module 20 uses a synthetic resin as a material, it is preferable that the reinforcing members 21, 22 are made of a metallic material.

The roof side member 12 of the side members 12, 13 will be described in detail as follows.

The roof side member 12 extends from the upper end of the C-pillar member 11 to the rear of the vehicle to become a side structure of the roof of the vehicle. A rear end of the roof side member 12 is coupled to an upper portion of the rear end module 20.

The rear end of the roof side member 12 is formed with an extension 12a extending in a height direction of the vehicle, that is, downward from the rear end of the roof side member 12 to extend to a D pillar 14. Specifically, the extension 12a extends from the rear end of the vehicle to a D pillar inner panel of the D pillar 14 disposed in the height direction of the vehicle.

An upper reinforcing member 21 for reinforcing rigidity is preferably provided on the portion where the roof side member 12 is coupled to the rear end module 20. The upper reinforcing member 21 has a shape connected in a circumferential direction of the rear end module 20 from a portion adjacent to the rear end of the rear end module 20 through the rear end of the rear end module 20. A part of the upper reinforcing member 21 is bonded to the roof side member 12, and the rest is coupled to the rear end module 20. The upper reinforcing member 21 can be bonded to the roof side member 12 by welding, and coupled to the rear end module 20 by the fastening bolt 23 and the adhesive 24.

The upper reinforcing member 21 is integrally formed with the rear end module 20 by the over-mold method when the rear end module 20 is molded, and the closed cross section is formed in the rear end module 20.

Figure 10:
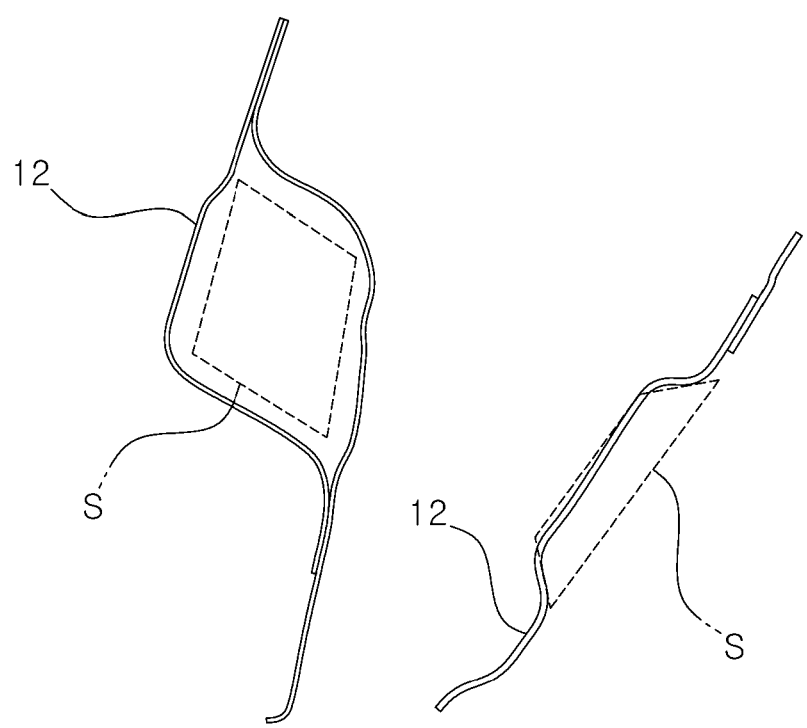
FIG. 10 is a cross-sectional diagram taken along line B-B of FIG. 7.
Figure 11:
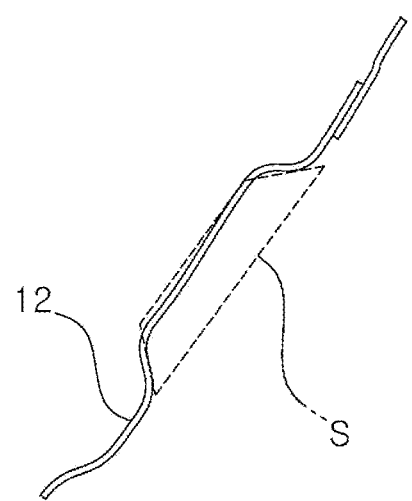
FIG. 11 is a cross-sectional diagram taken along line C-C of FIG. 7.

As shown in FIGS. 10 and 11, a closed cross section S is formed by the panel forming the roof side panel 12 on the middle portion of the roof side member 12 and a portion adjacent to the rear end thereof, thereby exerting rigidity, and the closed cross section S is formed by the upper reinforcing member 21 and the rear end module 20 on a portion where the roof side member 12 is coupled to the rear end module 20. Accordingly, the roof side member 12 does not lose and can maintain the closed cross section S on the middle portion, the portion adjacent to the rear end, and the rear end, thereby securing rigidity.

Figure 12:
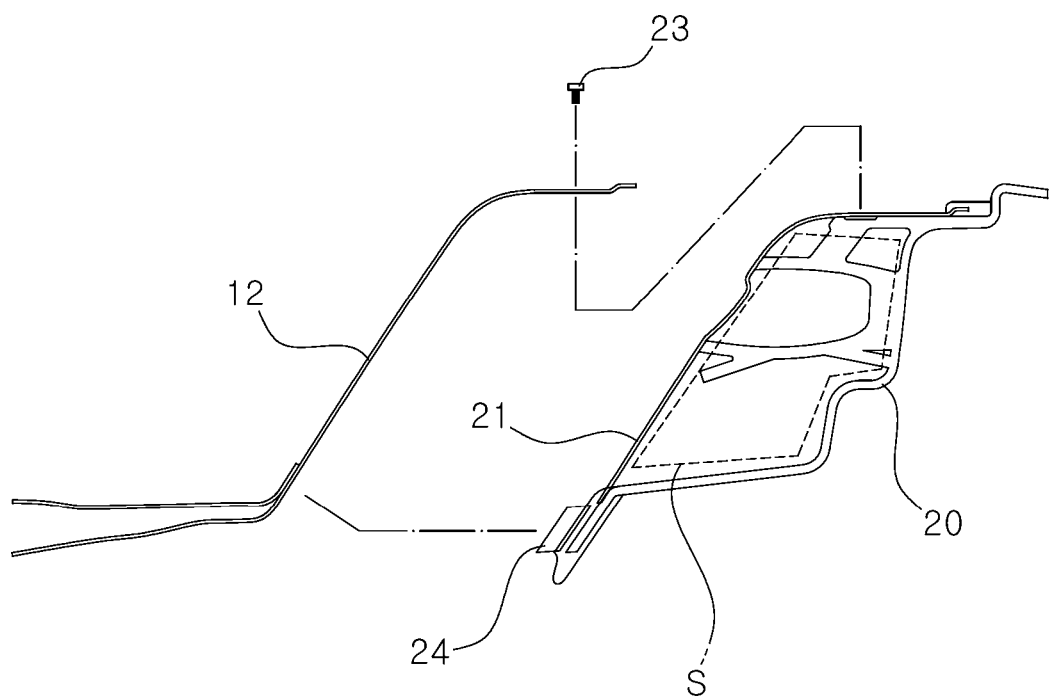
FIG. 12 is a cross-sectional diagram taken along line D-D of FIG. 7.

As shown in FIG. 12, a structure in which the roof side member 12 is coupled to the rear end module 20 on the rear end of the roof side member 12 can be bonded by the fastening bolt 23 or the adhesive. In the state where the roof side member 12 and the rear end module 20 are overlapped each other, the fastening bolt 23 penetrates the roof side member 12, the upper reinforcing member 21, and the rear end module 20 in the width direction of the vehicle to fasten the roof side member 12, the upper reinforcing member 21, and the rear end module 20, so that the roof side member 12 and the rear end module 20 are fastened. In addition, the roof side member 12 is bonded to the rear end module 20 by the adhesive 24 at a position spaced apart from the portion fastened by the fastening bolt 23.

The middle member 13 of the side members 12, 13 also has the same structure as that of the roof side member 12. However, the middle member 13 is located below the roof side member 12.

The middle member 13 is bonded to a front end of the middle member 13 on a middle portion of the C-pillar member 11, and extends to the rear of the vehicle therefrom to become the rear side structure of the vehicle. The rear end of the middle member 13 is coupled to the middle portion of the rear end module 20.

The rear end of the middle member 13 extends in the height direction of the vehicle, that is, each upward and downward from the rear end of the middle member 13 to form the extension 13a extending to the D-pillar 14. Specifically, the extension 13a extends from the rear end of the vehicle to a D pillar inner panel of the D pillar 14 disposed in the height direction of the vehicle.

A middle reinforcing member 22 for reinforcing rigidity is preferably provided on a portion where the middle member 13 is coupled to the rear end module 20. The middle reinforcing member 22 has a shape connected in the circumferential direction of the rear end module 20 from the portion adjacent to the rear end of the rear end module 20 through the rear end of the rear end module 20. A part of the middle reinforcing member 22 is bonded to the middle member 13, and the rest is coupled to the rear end module 20.

The middle reinforcing member 22 is integrally formed with the rear end module 20 by the over-mold method when the rear end module 20 is molded, and the closed cross section is formed in the rear end module 20.

As in the roof side member 12, the middle member 13 has its own closed cross section S formed on the middle portion and the portion adjacent to the rear end, the closed cross section S is formed between the middle reinforcing member 22 and the rear end module 20 on the rear end of the middle member 13, and the middle reinforcing member 22 is coupled to the rear end of the middle member 13. Accordingly, the middle member 13 also maintains the skeletal cross section capable of securing rigidity on the middle portion, the portion adjacent to the rear end, and the rear end, respectively.

The middle member 13 also has one side fastened to the middle reinforcing member 22 and the rear end module 20 through the fastening bolt 23, and is bonded to the rear end module 20 on the portion spaced apart therefrom by the adhesive.

What is claimed is:

1. A coupling structure of a rear end module and a side member comprising:
    a side member extending toward a rear of a vehicle from a C-pillar member; and
    a rear end module formed by injection to have an annular shape and coupled to a rear end of the side member;
    wherein a reinforcing member extending from a portion adjacent to the rear end of the side member in a circumferential direction of the rear end module and coupled to the side member and the rear end module is provided on a portion where the side member and the rear end module are coupled;
    wherein the side member is a roof side member located on a side surface of a roof of the vehicle to extend from an upper end of the C-pillar member to the rear of the vehicle;
    wherein a portion coupled to the roof side member and the rear end module is provided with an upper reinforcing member having a part bonded to the roof side member and the rest coupled to the rear end module;
    wherein the upper reinforcing member is extended from a rear end of the rear end module and connected in a circumferential direction of the rear end module;
    wherein the upper reinforcing member and the rear end module are of different materials, respectively; and
    wherein the upper reinforcing member is integrally formed with the rear end module.

2. The coupling structure of claim 1, wherein the side member is formed with an extension extending from the rear end of the side member in a height direction of the vehicle and connected to a D-pillar.

3. The coupling structure of claim 1, wherein the rear end module is injected by an over-mold method to be coupled to the reinforcing member, so that a closed cross section is formed on the rear end module.

4. The coupling structure of claim 1, wherein the side member is coupled to the reinforcing member by a fastening bolt or an adhesive.

5. The coupling structure of claim 4, wherein the side member and the reinforcing member are overlapped each other, and the fastening bolt penetrates the side member and the reinforcing member in a width direction of the vehicle to fasten the side member and the reinforcing member.

6. The coupling structure of claim 5, wherein the side member and the reinforcing member are bonded by the adhesive on a portion spaced apart from the portion fastened by the fastening bolt.

7. The coupling structure of claim 1, wherein the reinforcing member is made of a metallic material.

8. The coupling structure of claim 1, wherein the rear end module is made of a synthetic resin.

9. The coupling structure of claim 1, wherein ribs each are radially formed inside the rear end module.

10. The coupling structure of claim 1, wherein a fastening bolt fastening the side member and the reinforcing member to the rear end module is fastened to a place where ribs are gathered in the rear end module.

11. The coupling structure of claim 1, wherein an extension extending downward from a rear end of the roof side member is formed and is connected to a D-pillar.

12. The coupling structure of claim 1, wherein the side member is a middle member extending from a middle portion of the C-pillar member to the rear of the vehicle.

13. The coupling structure of claim 12, wherein an extension each extending in the height direction from a rear end of the middle member is formed and is connected to a D-pillar.

14. The coupling structure of claim 12, wherein a middle reinforcing member having a part bonded to the middle member and the rest coupled to the rear end module is provided on portions coupled to the middle member and the rear end module.

* * * * *